Figure 6:
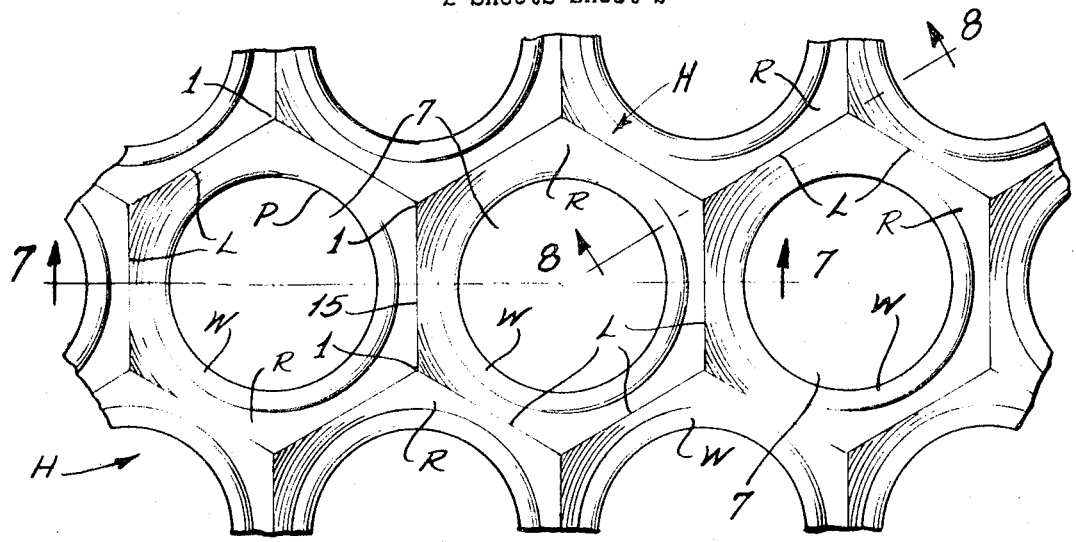

United States Patent [19]
Hibbeler

[11] 3,749,161
[45] July 31, 1973

[54] TUBESHEET CONSTRUCTION
[75] Inventor: Charles L. Hibbeler, Mehlvilhe, Mo.
[73] Assignee: Nooter Corporation, St. Louis, Mo.
[22] Filed: Jan. 27, 1972
[21] Appl. No.: 221,338

[52] U.S. Cl. ............................ 165/178, 29/157.3 C
[51] Int. Cl. ............................................. F28f 9/18
[58] Field of Search .................. 165/178, 173, 158, 165/178 TU

[56] References Cited
UNITED STATES PATENTS
3,367,414  2/1968  Brown et al. ................. 165/178
2,807,445  9/1957  Gardner ....................... 165/178 X Primary Examiner—Charles J. Myhre
Assistant Examiner—Theophil W. Streule, Jr.
Attorney—Roy A. Lieder et al.

[57] ABSTRACT

A tubesheet for a vessel, heat exchanger, or the like wherein each tube is welded in an opening in a tubesheet, there being a recess of special cross-sectional configuration circumscribing each opening, said configuration being such that no triangular portions remain between the openings in the tubesheet. Beyond a predetermined distance from each opening with this cross-sectional configuration, some metal from the tubesheet surface is removed at substantially every point by a tool which rotates about each opening. The end of the tube and the annular unrecessed portion of the tubesheet are welded together.

10 Claims, 9 Drawing Figures

Patented July 31, 1973
3,749,161
2 Sheets-Sheet 1
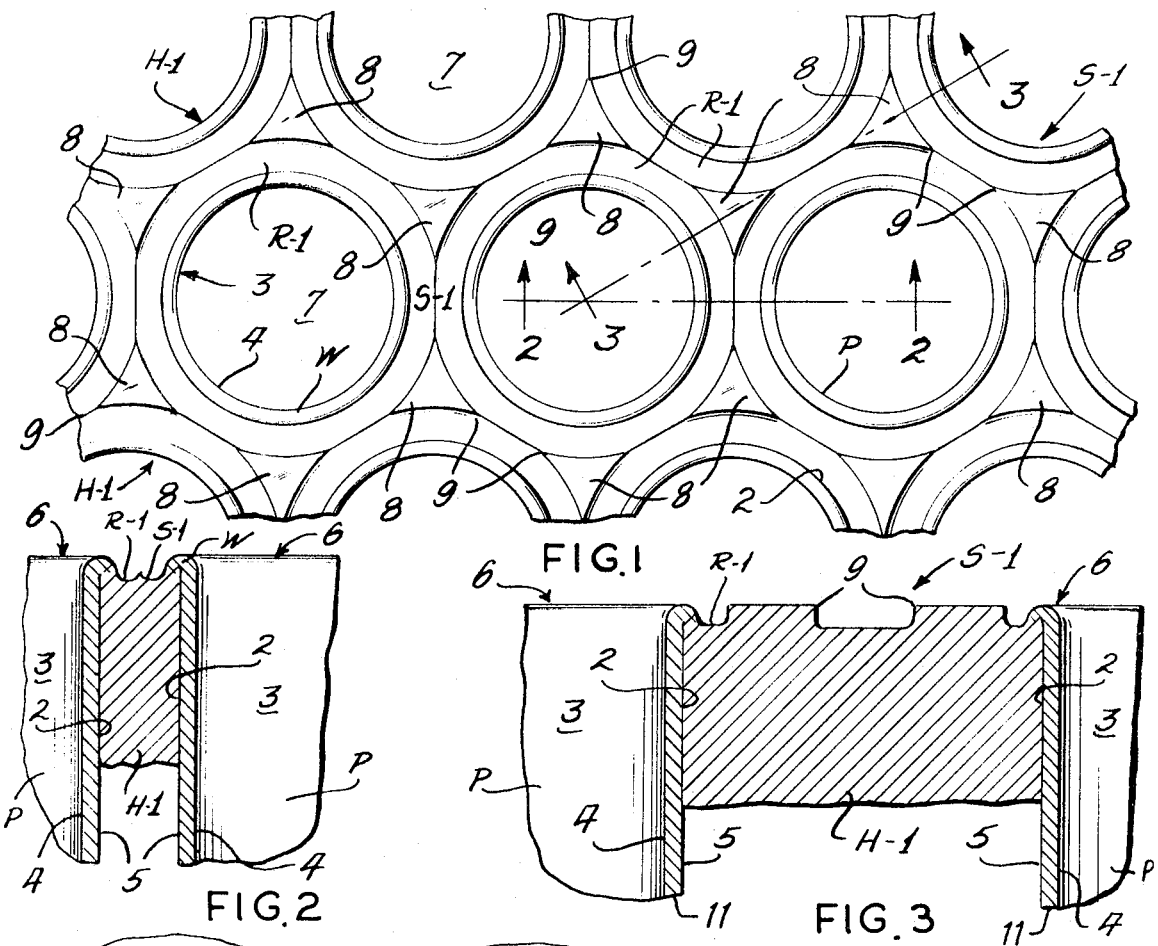

Patented July 31, 1973

3,749,161

2 Sheets-Sheet 2

TUBESHEET CONSTRUCTION

This invention relates to an improved tubesheet construction which is easier to manufacture, clean, and which lessens the likelihood of product hang up on the tubesheet while it is in use.

Vessels, heat exchangers, and the like which have tubesheets and tubes within their casing are well known in the art. There are several ways in which tubes have been secured to tubesheets by welding. A typical arrangement has recesses of predetermined width circumscribing each opening at a predetermined distance which leaves small triangular portions between the openings. These triangular portions have numerous disadvantages, since they may cause the electric arc to jump while welding the end of the tube to the tubesheet, with resulting damage to the tube and/or tubesheet and additional labor and expense to correct the same. In addition, the triangular portions make the tubesheet surface difficult for the fabricator to clean after initial manufacture, and make the tubesheet surface difficult for the actual user to clean. In addition, the triangular portions may cause product hang up which could cause cracks or crevice corrosion, thereby causing a leak. In some cases the leaking or mixing of the two fluids in a vessel is intolerable.

Also in the past in some constructions, recesses were provided around each opening in the tubesheet and these recesses were filled with a weld whose exposed surface was flush with the unrecessed surface of the tubesheet. This filler weld construction is expensive, time-consuming, and requires the deposit of much weld material. This filler type tubesheet construction is satisfactory but may cost several times as much as merely fusing the edges of tubes and the surrounding unrecessed surfaces of the tubesheet. Similarly, other known methods are expensive for joining tubes to tubesheets. One such other method used a fillet type weld.

The principal object of the present invention is to utilize the advantages of welding techniques and efficiencies used in the past in a tubesheet construction which does not have the small objectionable triangular portions between the tubes. Another object of this invention is to provide an outer tubesheet surface which can be easily cleaned by the fabricator and by the user of the equipment. Another object is to provide an outer tubesheet surface wherein there is either less likelihood or no likelihood of product hang up or the possibility of the product being trapped on the surface of the tubesheet which causes objectionable crevice corrosion and leaks. Still another object of the present invention is to provide such a construction wherein tubes of uniform cross-section are connected to circular openings in a tubesheet. These and other objects and advantages will become apparent hereinafter.

The prevent invention is embodied in a tubesheet construction for round tubes wherein the surface of the tubesheet has no objectionable triangular portions remaining between the tubes and has the original surface of the tube-sheet removed at substantially every point except immediately adjacent to the openings for the tubes and possibly at a point (not an area) between the tubes.

Figure 7:
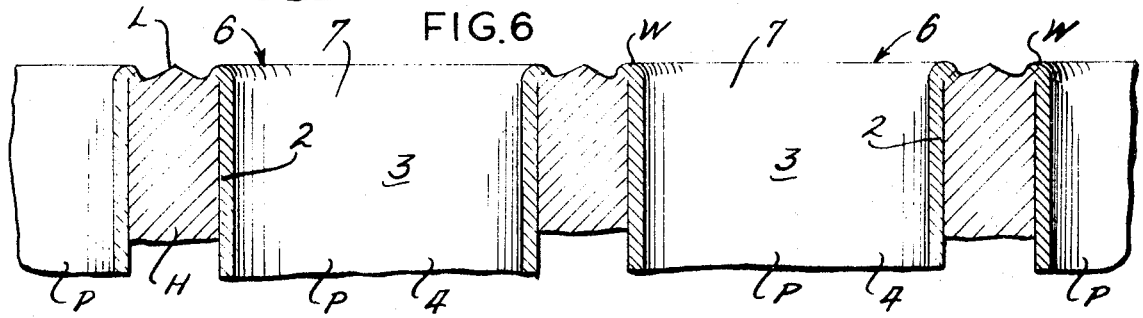
Figures 8, 9:
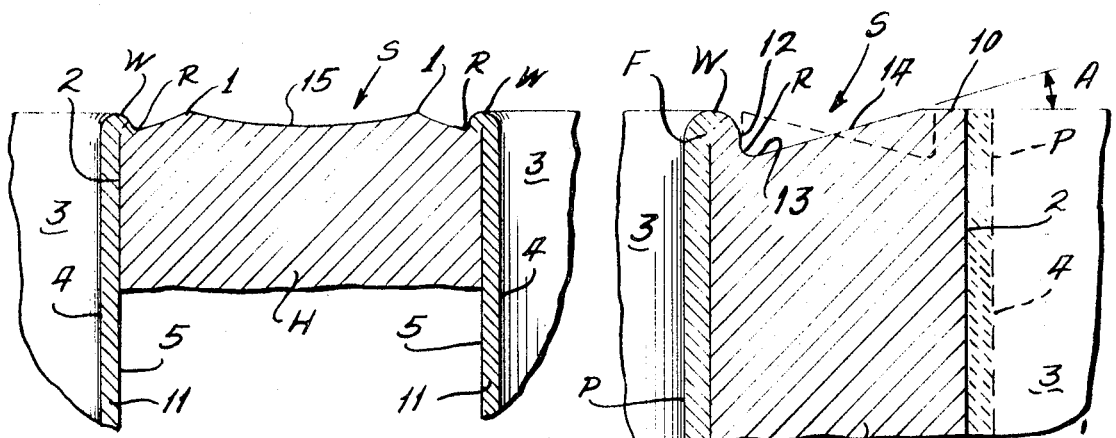

The invention further consists in the parts and in the arrangements and combinations of parts hereinafter described and claimed. In the accompanying drawings, which form part of the specification and wherein like numerals and symbols refer to like parts wherever they occur:

FIG. 1 is a plan view of a prior art tubesheet showing the openings and tubes with the triangular portions therebetween, FIG. 2 is a cross-sectional view taken along the line 2—2 of FIG. 1 which connects the centers of adjacent openings, FIG. 3 is a cross-sectional view taken along the line 3—3 of FIG. 1 connecting the center of one opening with the center of the triangular portion and the center of the adjacent opening, FIG. 4 is a plan view of a tube joined to a tubesheet by a prior art filler weld, FIG. 5 is a vertical cross-sectional view taken along the line 5—5 of FIG. 4 showing said filler weld, FIG. 6 is a fragmentary plan view of a tubesheet embodying the present invention, FIG. 7 is an enlarged cross-sectional view taken along the line 7—7 of FIG. 6 connecting the centers of two adjacent openings, FIG. 8 is a greatly enlarged cross-sectional view taken along the line 8—8 of FIG. 6 between the center of an opening and a raised point and the center of the adjacent opening, FIG. 9 is a greatly enlarged view of a portion of a tubesheet and tube with the recess of the present invention shown therein, showing on the left thereof a weld on the horizontal surface of the tubesheet and the edge of the tube, and showing on the right thereof an opening with a tube not welded thereto. The dotted lines at the surface S represent the cross-sectional outline of the adjacent recess which will circumscribe the adjacent opening.

Referring now to the drawings in detail, it will be seen that the embodiment and the invention which has been illustrated comprises a vessel, heat exchanger, or the like having therein a tubesheet H with tubes P secured thereto by means of a weld W. The tubesheet H has a recess R of predetermined cross-sectional configuration which forms a point 1, but not an area, between the tubes P.

Each tubesheet H has an outer surface S and a plurality of spaced circular openings 2 therein for receiving a round tube 3. The tubesheet H may be of any suitable thickness and may be made from any suitable material for the purpose for which the vessel is intended. This may be a single metal or a clad material and may be steel, stainless steel, titanium tantalum, Monel metal, or other metal. The tubes P are round or circular and have an inner surface 4, an outer surface 5, and an end edge 6. The tubes P also have a circular opening 7 therethrough. The tubes P may be made from any suitable material for the specific purpose for which the vessel is intended and which can be welded to the tubesheet material. The tubes P may be made from steel, aluminum, copper, titanium, tantalum, or other metals, including special alloys.

The specific materials used for the tubesheet H and tube P vary depending upon the purpose of the vessel, but the tube material must be compatible for welding with the tube-sheet material for any single vessel. The present invention can be used in connection with any tube which can be welded to a tubesheet. A typical vessel utilizing the present invention may cost tens or hundreds of thousands of dollars. The vessels may vary greatly in length from a few feet or less to 60 or a or a 100 feet or more. The diameter of a typical vessel utilizing the present invention may be 2 to 6 feet although smaller and larger diameters are possible and are frequently requested. The material specification, the size of tubes and their thickness, and the thickness of the tubesheet, as well as the diameter of the openings and the spacing therebetween varies depending upon the requirements of the ultimate user. In a typical 5 foot diameter tube-sheet, over 2,600 tubes may be used.

Referring now to FIGS. 1–3, which shown an old form of tubesheet H-1, it will be seen that the tubes P in the tubesheet H-1 were surrounded by recesses R-1 which resulted in triangular portions 8 between the tubes P. These triangular portions 8 had sharp corners 9 and had an outer surface S-1 which was at the same level as the tubesheet surface S-1 immediately adjacent to the tubesheet opening 2. In short, the upper surfaces of the triangular portions 8 were the original surface S-1 of the tubesheet H-1, since no metal was cut away when the recesses R-1 were made. These triangular portions 8 in practice had several important disadvantages. When welding the tube P to the tubesheet H-1, the arc might jump to the triangular portion 8 if the operator did not weld perfectly, such as if the welder's hand was not steady and moved toward the triangular portion 8 the slightest amount. This would cause damage which would have to be repaired with a waste of time, effort, and money. Even if the welds surrounding each of the possible thousands of tubes were made perfectly without any arcing across, the tubesheet surface was difficult for the fabricator to clean due to the presence of foreign bodies in the recesses which were restricted from movement because of the triangular portions 8. In addition to the fabricator's difficulty in cleaning the tubesheet initially so that it would be accepted by the customer and ultimate user, the triangular portions 8 would tend to trap the product or cause the product to hang up due to the presence of sharp corners 9 and burrs thereon. Of course, this cleaning requires the vessel and related equipment to be out of service for some length of time. If not properly cleaned, some products have a corrosive effect which becomes even more corrosive when trapped, which tends to cause product decay and cause cracks or crevices which ultimately will corrode out the weld or parent metal and cause a leak. When this happens, the two fluids in the vessel may intermix to a degree, which could be dangerous in some cases and which might ruin the product in other cases. In any event, this intermixing of fluids would be a result not intended by the user.

The present invention is best shown in FIGS. 6–9. Referring to FIG. 6, it will be seen that the tubesheet H has an outer surface S and many circular openings 2 therein which are adapted to receive round tubes 3 of uniform wall thickness 2nd diameter. Recesses R circumscribe the openings 2 a predetermined amount, thereby leaving an annular surface 10 immediately adjacent to each opening 2. The width of the annular surface 10 should be as thick as the tube wall 11 or thicker. In actual practice it is not less than about 0.040 inches. The width of each recess R is equal to or slightly less than the distance between the closest edges of the tube-sheet openings minus twice the width of said annular portions 10. The recess R has a steep inner wall 12 adjacent to the opening 2 which it surrounds, a bottom radius 13 which is as large as possible to relieve stress, and an upwardly sloping outer wall 14 which extends upwardly at an angle A. The angle A is about 16° but may vary upwardly to about 31°. The bottom radius 1e may be 1/32 of an inch, or may vary between 0.030 to 0.040 inches. The angle A becomes greater as the tubes P get closer since the outer wall 14, when projected, cannot cut off any part of the annular surface 10 surrounding the next adjacent opening 2. The recess R extends 360° around the opening 2 and its surrounding annular surface 10.

When this same recess R is made around the next adjacent opening 2, it removes some of the material between the openings 2 which results in removing substantially all of the surface S of the tubesheet H between the annular surfaces 10 surrounding the adjacent openings 2. As seen in FIG. 6, this results in a ridge or line L equidistant between the two openings 2. This line L is curved when viewed from the side as best shown in FIG. 8, and has its ends 1 higher than its center 15, which is on a line connecting the centers of any two openings 2. The raised ends 1 of the line of surrounding adjacent openings intersect at a point (not an area) which may either be the original surface S of the tubesheet H but more often slightly therebelow. In practice, the ends or points 1 are slightly below the original surface S in order to ensure that no triangular portion 8 remains between the openings 2. In practice, the points 1 are equally spaced from the centers of the three adjacent openings 2 and a distance which is slightly greater than about 57.7 percent of the distance between the closest edges of two adjacent openings 2 in the tubesheet H.

The end edge 6 of the tube P and the outer surface S of the tubesheet H are preferably flush with each other before the weld W is made. The weld W actually is a fusion of the tube P near its end to the tubesheet H immediately adjacent to the annular surface 10. In welding a tube P to the tube-sheet H, the depth of fusion F of the weld W should be at least the thickness of the tube wall 11. The annular surface 10 is also at least the thickness of the tube wall 11. In this manner, the tube wall 11 will be equal to or thinner than either the thickness of the annular surface 10 or the depth of fusion F. In practice, the tube wall 11 is thinner than the annular surface 10, because the tubes P can be replaced. Should either the depth of fusion F or the annular surface 10 be less than the tube wall 11, it is possible that corrosion might penetrate these smaller distances and reach the juncture of the tube wall 11 and tubesheet H at a point beneath the outer surface S, thereby causing leakage in the vessel.

The weld W is not deposited metal on the end edge 6 of the tube P or the annular surface 10, but rather is a fusing together so that there is a rounded portion at that point which is flush with the original outer surface S of the tubesheet H and is no higher after welding than the other unwelded annular surface 10 and the end edge 6 of the tube P. The welds W are applied one at a time by an experienced welder who fuses the two pieces together with the proper depth of fusion F. After the weld W has been formed, the top of the combined or fused together end edge 6 and annular surface 10 are no higher than they were before the welding took place. In cross-section, as best shown in FIG. 9, the weld W has a curved top which aids in the flow of material and prevents product hang up and reduces the likelihood that corrosion will prematurely damage the tubes P or tubesheet H.

FIGS. 4 and 5 show a further old form of tubesheet H-2 wherein an annular recess R-2 surrounds each opening 2 and said recesses R-2 are each filled with a filler weld W-2. Each tube P has an inner surface 4, an outer surface 5, a tube wall 11, and an opening 7. This filler type tubesheet H-2 is expensive and requires the deposit of much weld material, as previously explained. In addition, the filler type tube attachment and fillet type tube attachment tend to distort and warp the tubesheet, whereas the recess type tube attachment of the present invention does not. The recess type weld is especially desirable for welding the thinner wall tubes. The recess R reduces the heat sink effect in the thicker tube-sheets making it possible to accomplish the desired penetration with less heat applied. Therefore, there is less distortion of the tubesheet.

This invention is intended to cover all changes and modifications of the example of the invention herein chosen for the purpose of the disclosure, which do not constitute departures from the spirit and scope of the invention.

What is claimed is:

1. In a tubesheet construction for a vessel, said tubesheet having a plurality of openings therein for receiving tubes therein, an annular portion surrounding each of said openings, said annular portion being the original surface of the tubesheet, said annular portions being at least as wide as the wall thickness of said tubes, each of said tubes having an end positioned adjacent to said annular portion of said tubesheet, said tubes being welded to said tubesheet, the improvement which comprises providing a recess of predetermined cross-section circumscribing each opening outwardly of said annular portion, said recess having a width sufficiently great so that some of the original surface of said tubesheet is removed substantially at every point between the annular portion surrounding each of said tubesheet openings so that substantially all of the original surface of the tubesheet between the annular portions surrounding the tubesheet openings is removed, said recess having an inner wall substantially perpendicular to the original tubesheet surface, the depth of said inner wall being controllable by observing the width of said recess.

2. The improvement set forth in claim 1 wherein all of the original surface of the tubesheet is removed outwardly of the annular portions surrounding said tubesheet openings, said removal caused by the annular recesses which surround said tubesheet openings.

3. The improvement set forth in claim 1 wherein each recess surrounding the annular portion which surrounds the tubesheet opening has an inner wall substantially perpendicular to said annular portion and a relatively large radius at the bottom thereof and an outer wall which slopes upwardly.

4. The improvement set forth in claim 1 wherein the said recess has an inner wall which is substantially perpendicular to the original tubesheet surface and an outer wall that slopes at an angle of between about 16° to 31° with said original tubesheet surface, there being a relatively large radius of curvature connecting said inner wall and said outer wall.

5. The improvement set forth in claim 1 wherein the width of said recesses is slightly less than the distance between the closest edges of said tubesheet openings minus twice the width of said annular portions.

6. The improvement set forth in claim 1 wherein the outer edge of said recess is spaced from the center of an opening a distance which is slightly greater than about 57.7 percent of the distance between the centers of adjacent openings in the tubesheet.

7. The improvement set forth in claim 1 wherein points on the original tubesheet surface remain between the tubesheet openings, said points being spaced equidistant from surrounding openings and having no substantial area thereon, and wherein the depth of each recess is substantially the same.

8. The improvement set forth in claim 1 wherein said openings in said tubesheet are circular and wherein said tubes are circular and are of uniform wall thickness and cross-sectional area throughout their length.

9. The improvement set forth in claim 1 wherein the width of the annular portion surrounding an opening is at least as great as the wall thickness of the tube within said opening, and wherein the depth of fusion when the tube is welded to the tubesheet is at least as great as the wall thickness of the tube within said opening.

10. The improvement set forth in claim 1 wherein weld at the annular portion and the end edge of the tube has an outer surface at about the same level as the original annular portion and end edge of the tube.

* * * * *